United States Patent [19]

Kania et al.

[11] 4,132,158

[45] Jan. 2, 1979

[54] VENTILATING INSTALLATION FOR A VEHICLE BODY, ESPECIALLY OF A PASSENGER MOTOR VEHICLE

[75] Inventors: Sigmund Kania, Sindelfingen; Wolfgang Frank, Boblingen, both of Germany

[73] Assignee: Daimler-Benz Aktiengesellschaft, Germany

[21] Appl. No.: 776,247

[22] Filed: Mar. 10, 1977

[30] Foreign Application Priority Data

Mar. 13, 1976 [DE] Fed. Rep. of Germany ....... 2610731

[51] Int. Cl.² .............................................. B60H 1/26
[52] U.S. Cl. .................................................. 98/2.18
[58] Field of Search ............................... 98/2.14–2.18, 98/2

[56] References Cited

U.S. PATENT DOCUMENTS

| | | | |
|---|---|---|---|
| 3,259,051 | 7/1966 | Boche et al. | 98/2.18 |
| 3,357,338 | 12/1967 | Pollock | 98/2.18 |
| 3,520,243 | 7/1970 | Wessells | 98/2.18 |
| 3,554,110 | 1/1971 | Goetz | 98/2.18 |
| 3,763,762 | 10/1973 | Tsuda | 98/2.18 |

Primary Examiner—Henry C. Yuen
Attorney, Agent, or Firm—Craig & Antonelli

[57] ABSTRACT

A ventilating system for vehicle bodies, especially of passenger motor vehicles, in which the rear column accommodates within its hollow space an air conduction and water discharge installation and which is provided with one or several air dishcarge openings within the area of the rear column; the air conduction and water discharge installation is thereby constructed trough-shaped and is formed out of a profiled partition wall that is supported at the narrow sides of the rear column and extends from the roof area to near the wheel casing; the air inlet takes place from the vehicle body behind the air discharge opening offset in the driving direction while the lower boundary of the air conduction and water discharge installation is formed by the lower edge of the lowermost air discharge opening.

9 Claims, 4 Drawing Figures

VENTILATING INSTALLATION FOR A VEHICLE BODY, ESPECIALLY OF A PASSENGER MOTOR VEHICLE

The present invention relates to a ventilating installation for vehicle bodies, especially of passenger motor vehicles, with a forced air circulation, and with a rear column consisting essentially of a vehicle body outer sheet metal panel member and of a vehicle body inner sheet metal panel member arranged at a distance therefrom, which sealingly accommodates in its interior hollow space an air conduction and water discharge arrangement with respect to the outer sheet metal member, and which is provided with at least one air discharge opening provided within the area of each rear column.

An installation for the ventilation of the passenger space is disclosed in the German Offenlegungsschrift No. 1,680,018, in which the free space inside of each rear column is subdivided by a partition wall into an air-feed channel and into a water and air discharge channel.

However, disadvantageous with this prior art construction is the use of several individual sheet metal members which have to be manufactured in a costly manner and have to be welded together along several seams.

Finally, a further ventilation installation is disclosed in the German Auslegeschrift No. 1,903,330 in which a pan-like structure is secured, for example, by spot-welding behind an opening in the rear column on the inside of the outer sheet metal member. The exhaust air is thereby guided out of the passenger space from the roof area downwardly and outwardly whereas water which has penetrated is discharged by way of a discharge opening by means of a suitable discharge installation.

It is disadvantageous with this prior art construction that as a result of the relatively large cutouts in the outer sheet metal member, the rear column is weakened within this area. The pan-like structure involves a complicated individual part unfavorable as regards cost. Also, the arrangement of the seal in direct proximity of the spot-welded places is of disadvantage. The welding may cause a strong heat-up of the seal so that the same becomes brittle and prematurely water-permeable or moisture-pervious.

In contradistinction thereto, it is the aim of the present invention to avoid the aforementioned disadvantages and to provide a ventilating system which assures a completely satisfactory air-exhaust and water-discharge.

The underlying problems are solved according to the present invention by a combination of the following features which may in part be known as such:

(a) The air conduction and water discharge installation is constructed trough-shaped and is formed out of a profiled partition wall supported at the narrow sides of the rear column and extending from the roof area to the wheel casing, (b) The air inlet from the vehicle body takes place offset in the driving direction behind the air discharge opening or openings, and (c) The lower extent of the air conduction and water discharge installation is delimited by the lower edge of the lowermost air discharge opening.

The partition wall thereby serves as structural bearing part in the rear column and therewith as reinforcing element.

A good air-quantity distribution and therewith an effective ventilation is achieved if the air inlet opening in the partition wall of the rear column is located in the outer sheet metal member within the center area of the length extent of the air discharge openings.

In order to prevent that water and moisture penetrate by way of the trough between the outer sheet metal member and the partition wall, a self-adhesive loop or sealing ring is provided as seal which is inserted into an approximately handle-shaped groove of the partition wall surrounding the trough.

A pleasing appearance is achieved if the discharge openings in the outer sheet metal member of the rear column are covered off by shield or hood open in a direction opposite the driving direction.

Accordingly, it is an object of the present invention to provide a ventilation system for vehicle bodies, especially of passenger motor vehicles which avoids by simple means the aforementioned shortcomings and drawbacks encountered in the prior art.

Another object of the present invention resides in a ventilating system for vehicle bodies which is relatively simple in structure and relatively low in manufacturing cost.

A further object of the present invention resides in a ventilating system for vehicle bodies of the type described above in which the rear columns are not unnecessarily weakened by relatively large cutouts of the exhaust air system. Still a further object of the present invention resides in a ventilating installation for vehicle bodies, especially of passenger motor vehicles, in which the individual parts are of simple configuration, can be readily manufactured and are easy to assemble without excessive welds.

Another object of the present invention resides in a ventilating arrangement for vehicle bodies of the type described above in which the seals are effectively protected against excessive heat-up due to the welding together of various sheet metal members.

A still further object of the present invention resides in a ventilating system for passenger motor vehicles which assures a completely satisfactory air exhaust and water discharge, yet permits a pleasing appearance to the eye of the vehicle's observer.

These and other objects, features and advantages of the present invention will become more apparent from the following description when taken in connection with the accompanying drawing which shows, for purposes of illustration only, one embodiment in accordance with the present invention, and wherein.

Figure 1:
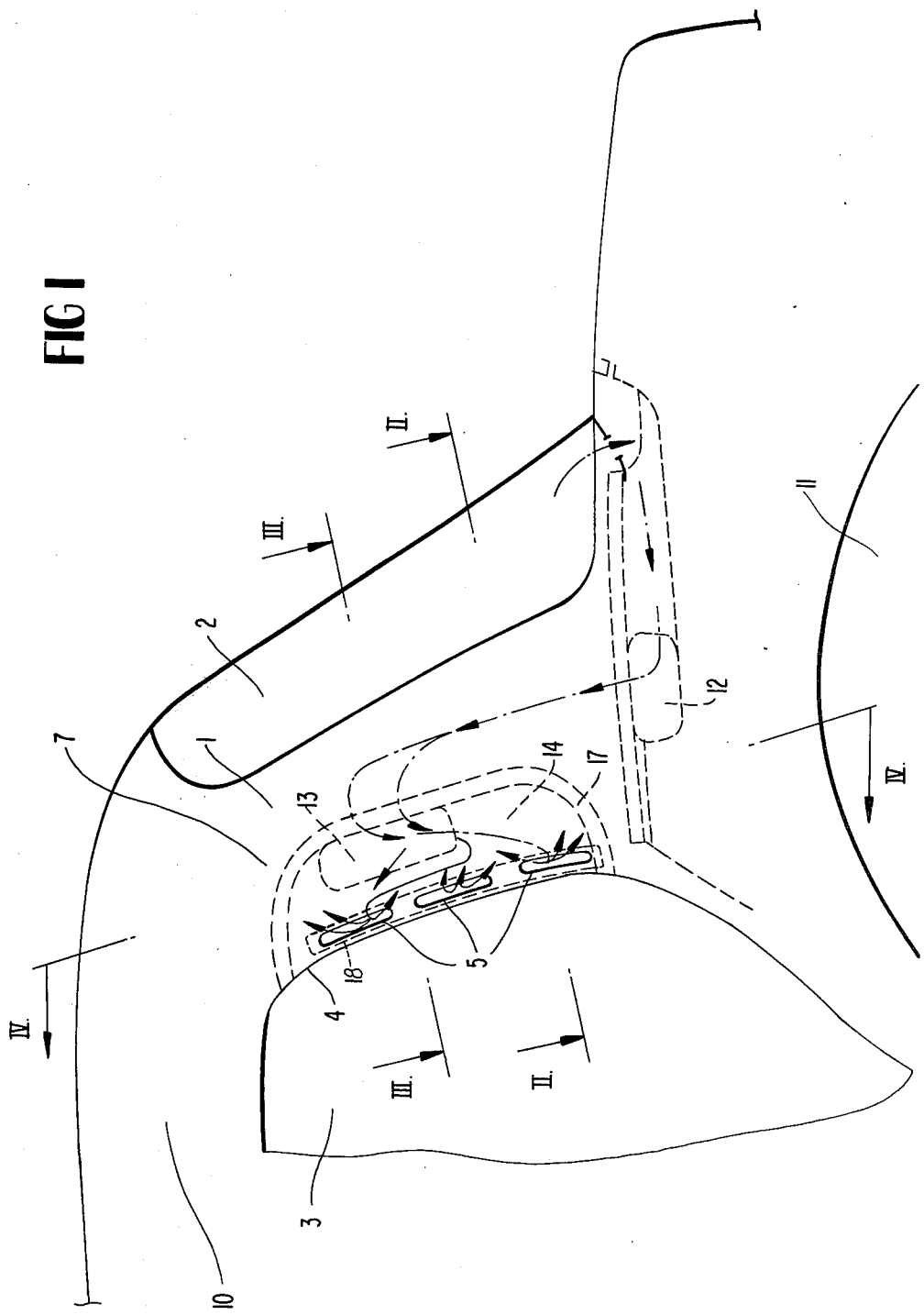
FIG. 1 is a partial, somewhat schematic side elevational view of the rear column area of a passenger motor vehicle equipped with a ventilating system in accordance with the present invention.
Figure 2:
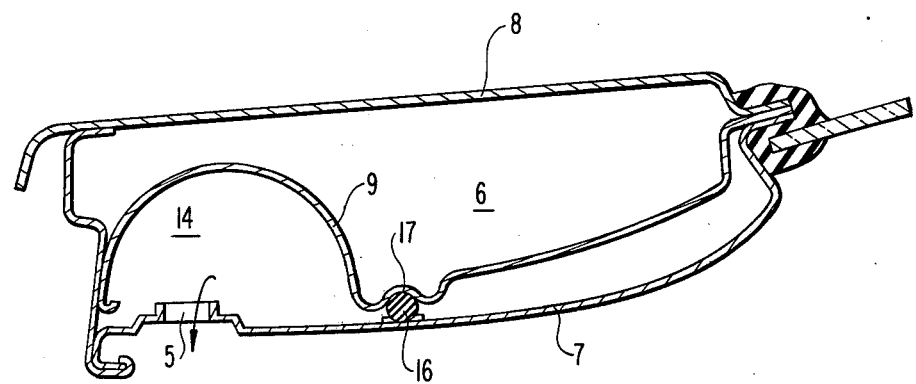
FIG. 2 is a cross-sectional view taken along line II—II of FIG. 1.
Figure 3:
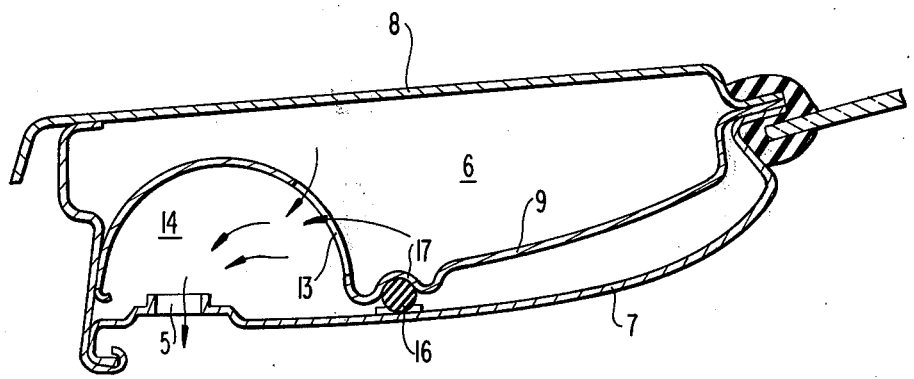
FIG. 3 is a cross-sectional view taken along line III—III of FIG. 1.
Figure 4:
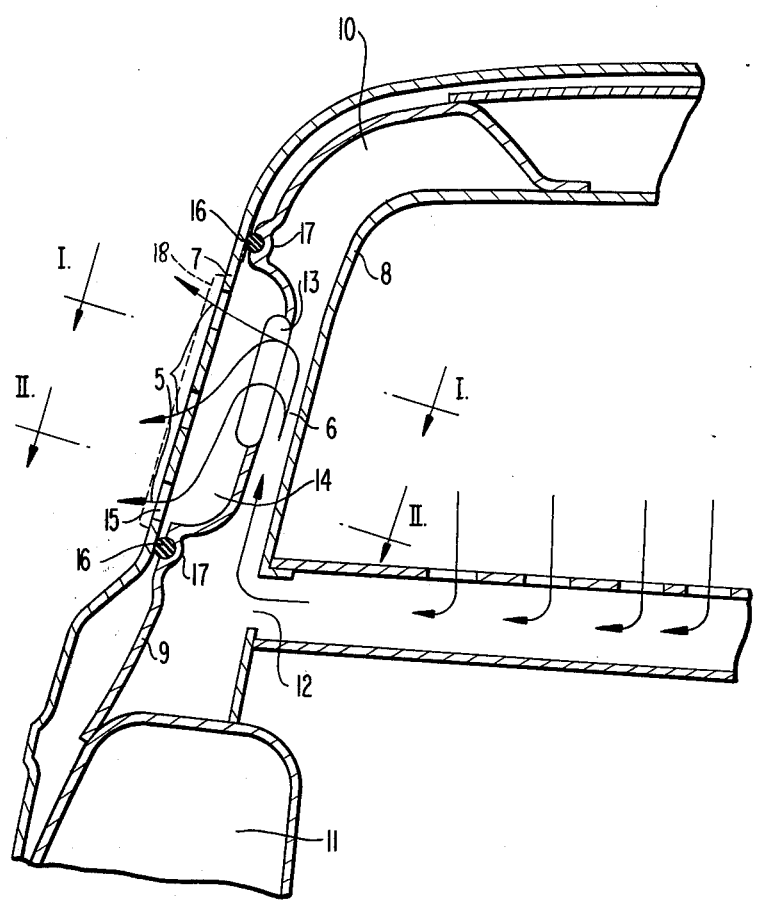
FIG. 4 is a cross-sectional view taken along line IV—IV in FIG. 1 in the direction of the adjoining air guide channel underneath the rear window.

Referring now to the drawing wherein like reference numerals are used throughout the various views to designate like parts, FIG. 1 illustrates a rear column 1 which is delimited by a rear window 2 and a body cutout 3 for the rear door. In the rear column 1 several openings 5 are provided in the outer sheet metal member 7 within the area directly adjacent the edge 4 of the body cutout 3, which are in communication with the interior space of the vehicle. This communication results—as shown in FIGS. 2 to 4—by a channel 6 within the hollow space of the rear column 1 serving the air-conduction or air-guidance which is formed by a profiled partition wall 9 intermediate the outer sheet metal member 7 and an inner sheet metal member 8. This partition wall 9 extends inside of the rear column 1 from the roof area 10 to the wheel casing 11. The channel 6 is in communication with the interior space of the vehicle by way of an opening 12 (FIGS. 1 and 4) in the inner sheet metal member 8. The exhaust air out of the passenger interior space is conducted upwardly within the channel 6 in the rear column 1 and reaches, by way of an opening 13, a trough 14 of the partition wall 9 and, by way of the air discharge openings 5 in the outer sheet metal member 7, the atmosphere. It is effectively prevented by the arrangement of the openings 5 in the outer sheet metal member 7 and by the opening 13 in the partition wall 9 within the area of the trough 14, which is mutually offset in the driving direction that water is able to enter into the air conduction or air guide channel 6. Any water that has penetrated is immediately conducted away toward the outside by the shape of the trough 14 which is delimited by the lower edge 15 (FIG. 4) of the lowermost air discharge opening 5. It will be prevented by a self-adhesive sealing ring used as seal 16 which is inserted into an approximately handle-shaped groove 17 in the partition wall 9 surrounding the trough 14, that water or moisture penetrates into the hollow space of the rear column 1 and leads to premature corrosion damages. Simultaneously, the seal 16 serves for the elastic support of the partition wall 9 at the outer sheet metal member 7 which can be assembled in a simple manner without fixed connection to the partition wall 9. The discharge openings 5 in the outer sheet metal member 7 of the rear column 1 are covered off by a shield or hood 18, which is shown in dash lines in FIGS. 1 and 4 which is arranged within the area of the edge 4 and is open in a direction opposite the driving direction.

The embodiment according to the present invention of a ventilating installation serving the air conduction and water discharge which has been described hereinabove additionally entails the advantage that the partition wall 9 supported at the narrow sides of the rear column 1 remains preserved as structural bearing part and therewith serves for the additional reinforcement.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A ventilating installation for vehicle bodies having a forced air circulation, comprising a hollow rear column means including a relatively wide outer sheet-metal body portion and a relatively wide inner sheet-metal body portion arranged at a distance therefrom, and relatively narrow side portions extending between said inner and outer sheet-metal body portions so as to delimit a hollow space within said rear column means, said rear column means sealingly accommodating within its hollow space with respect to the outer sheet-metal body portion air conduction and water discharge means, and at least one air discharge opening means provided within the area of the rear column means, characterized in that the air conduction and water discharge means is constructed as an approximately trough-shaped portion of a partition wall means, and in that an inlet for air from the vehicle body is provided in the partition wall means at a position behind the air discharge opening means and offset therefrom along the length of the vehicle body, and wherein the lower boundary of the approximately trough-shaped air conduction and water discharge means is delimited by the lower edge of the lowermost air discharge opening means to thereby allow the conducting away of any water that has penetrated the air discharge opening means, and further characterized in that the partition wall means is profiled, is supported at the narrow side portions of the rear column means and extends from a roof area, to a wheel casing area of the vehicle body and thereby serves as a structural bearing part and reinforcing element in said rear column means.

2. A ventilating installation according to claim 1, characterized in that said at least one air discharge opening means is provided in said outer sheet-metal body portion and wherein the air inlet provided in the partition wall means is located within the center area of the length extent of the air discharge opening means in the outer sheet-metal body portion.

3. A ventilating installation according to claim 2, characterized in that a self-adhesive loop is provided as a seal which is inserted into a groove of the partition wall means surrounding the trough-shaped air conduction and water discharge means portion thereof for sealing engagement with the inner side of said outer sheet metal body portion, said self-adhesive loop also serving for the elastic support of the partition wall means at the outer sheet-metal body portion.

4. A ventilating installation according to claim 3, characterized in that the discharge opening means in the outer sheet-metal body portion of the rear column means is covered off by a hood-like cover means open in a direction toward the rear of the vehicle body.

5. A ventilating installation according to claim 1, characterized in that a self-adhesive loop is provided as a seal which is inserted into a groove of the partition wall means surrounding the trough-shaped air conduction and water discharge means portion thereof for sealing engagement with the inner side of said outer sheet metal body portion, said self-adhesive loop also serving for the elastic support of the partition wall means at the outer sheet metal body portion.

6. A ventilating installation according to claim 1, characterized in that the discharge opening means in the outer sheet-metal body portion of the rear column means is covered off by a hood-like cover means open in a direction toward the rear of the vehicle body.

7. A ventilating installation for a vehicle body having a forced air circulation, comprising a hollow rear column means of a vehicle body including an outer sheet-metal body portion and an inner sheet-metal body portion arranged at a distance therefrom, and relatively narrow side portions extending between said inner and outer sheet-metal body portions so as to delimit a hollow space within said rear column means said rear column means sealingly accommodating within its hollow space with respect to the outer sheet-metal body member air conduction and water discharge means, and at least one air discharge opening means provided within the area of the rear column means, characterized in that the air conduction and water discharge means is constructed as an approximately trough-shaped portion of a partition wall means which is supported at the narrow side portions of the rear column means and extends from a roof area to a wheel casing area of the vehicle body to partition said outer sheet-metal body member from said inner sheet-metal body member and to serve as a structural bearing part and reinforcing element in said rear column, and in that an inlet for air from the vehicle body is provided in the partition wall means, and wherein the lower boundary of the approximately trough-shaped air conduction and water discharge means is delimited by the lower edge of the lowermost air discharge opening means to thereby allow the conducting away of any water that has penetrated the air discharge opening means.

8. A ventilating installation according to claim 7, characterized in that the inlet for air from the vehicle body provided in the partition wall means is at a position behind the air discharge opening means and offset therefrom along the length of the vehicle body.

9. A ventilating installation according to claim 7, characterized in that a self-adhesive loop is provided as a seal which is inserted into a groove of the partition wall means surrounding the trough-shaped air conduction and water discharge means portion thereof for sealing engagement with the inner side of said outer sheet-metal body member, said self-adhesive loop also serving for the elastic support of the partition wall means at the outer sheet-metal body portion.

* * * * *